United States Patent
Chang

(10) Patent No.: US 7,258,737 B2
(45) Date of Patent: Aug. 21, 2007

(54) METHOD FOR RECYCLING CONCRETE WASTE

(75) Inventor: Cheng-Feng Chang, Kaohsiung Hsien (TW)

(73) Assignee: Cheng-Mao Chang, Kaohsiung Hsien (TW)

( * ) Notice: Subject to any disclaimer, the term of this patent is extended or adjusted under 35 U.S.C. 154(b) by 304 days.

(21) Appl. No.: 11/130,272

(22) Filed: May 17, 2005

(65) Prior Publication Data

US 2006/0260514 A1   Nov. 23, 2006

(51) Int. Cl.
*C04B 7/36* (2006.01)
*C04B 18/00* (2006.01)

(52) U.S. Cl. .................. 106/745; 106/713; 106/756; 106/757; 241/24.1; 241/29

(58) Field of Classification Search ................ 106/713, 106/745, 756, 757; 241/24.1, 29
See application file for complete search history.

(56) References Cited

U.S. PATENT DOCUMENTS 4,239,547 A * 12/1980 McBee et al. .............. 106/274

OTHER PUBLICATIONS

Answer 14 to 28 Chemical Abstracts on STN☐☐JP 2003261905 (Kuroda et al.) Sep. 19, 2003 abstract only.*
Answer 16 of 28 Chemical Abstracts on STN☐☐JP 2003183063 (Hashimoto et al.) Jul. 3, 2003 abstract only.*
"Preparation of reclaimed cement from waste concrete", Kojima et al., Gypsum and Lime (1993), 244, 153-163.☐☐☐☐Answer 89 of 117 of Chemical Abstracts on STN (see one page abstract only).*
Answer 12 of 28 of Chemical Abstracts on STN☐☐"Recovery of fine aggregate and cement hydrate powder from fine waste concrete by multigravity separator",☐☐Hirajima et al., Shigen to Sozai (2003), 119(9), 553-558.*

* cited by examiner

*Primary Examiner*—Paul Marcantoni
(74) *Attorney, Agent, or Firm*—Foley & Lardner LLP

(57) ABSTRACT

A method for recycling concrete waste includes the steps of: a) heating the concrete waste to provide a measure of fragility to the concrete waste; b) milling and sieving the heated concrete waste to separate coarse aggregate from the concrete waste; and c) milling and sieving a remaining portion of the concrete waste remaining after separation of the coarse aggregate to separate the remaining portion of the concrete waste into a cement-containing fraction and fine aggregate.

13 Claims, 3 Drawing Sheets comparison of compressive strength between regenerated cement of this invention and Portland cement type I

METHOD FOR RECYCLING CONCRETE WASTE

BACKGROUND OF THE INVENTION

1. Field of the Invention

The invention relates to a method for recycling concrete waste, particularly to a method for recycling concrete waste to make regenerated cement.

2. Description of the Related Art

Generally, concrete is primarily composed of cement clinker, coarse aggregate (such as gravel), and fine aggregate (such as sand). The cement clinker is mixed with water to form a cement paste which bonds with the coarse and fine aggregate as the cement solidifies due to the hydration reaction between the cement and water. Therefore, a variety of constructional structures, such as floors, wall slabs, and the like, can be built thereby.

However, when the structures are torn down, concrete waste is required to be processed so as to avoid causing an environmental pollution problem. Conventionally, the concrete waste is crushed and milled directly, and is then sieved to separate and recover the aggregate from cement lumps. However, since the recovered aggregate may have cement adhered thereon, the value for reusing the aggregate is lowered. Additionally, the recovered cement lumps cannot be reused.

SUMMARY OF THE INVENTION

Therefore, the object of the present invention is to provide a method for recycling concrete waste so as to make regenerated cement.

In the first aspect of this invention, a method for recycling concrete waste includes the steps of:

a) heating the concrete waste to provide a measure of fragility to the concrete waste;

b) milling and sieving the heated concrete waste to separate coarse aggregate from the concrete waste; and c) milling and sieving a remaining portion of the concrete waste remaining after separation of the coarse aggregate to separate the remaining portion of the concrete waste into a cement-containing fraction and fine aggregate.

In the second aspect of this invention, a method for making regenerated cement includes the steps of:

a) separating a cement-containing fraction from concrete waste; and b) mixing the cement-containing fraction with CaO, and heating the mixture of the cement-containing fraction and CaO.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
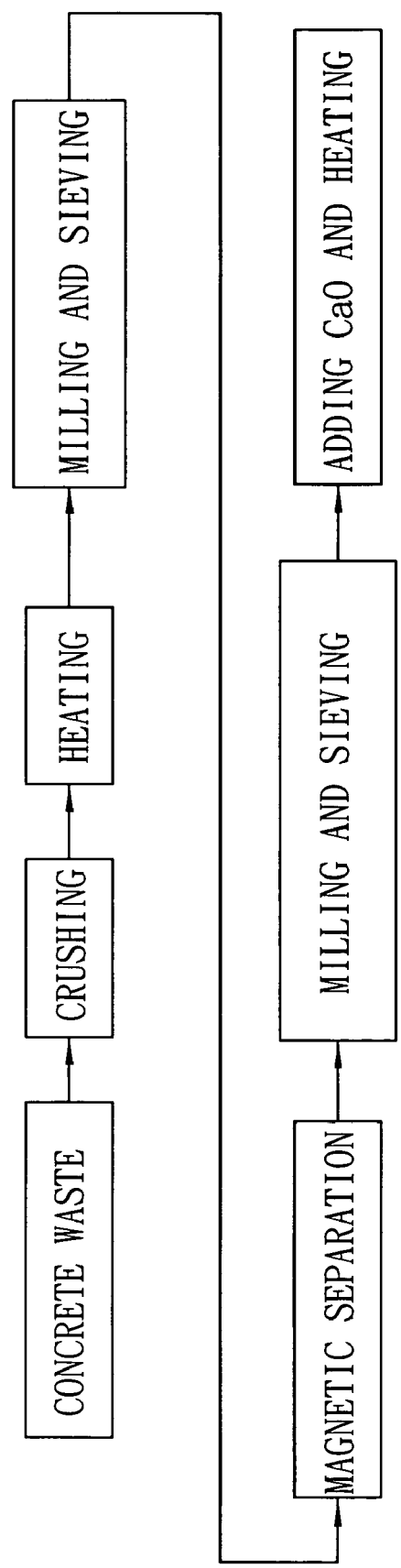
FIG. 1 is a flow diagram of the preferred embodiment of a method for recycling concrete waste to make regenerated cement according to this invention.

Referring to FIG. 1, the preferred embodiment of the method according to this invention is for recycling concrete waste to make regenerated cement. The concrete waste is primarily composed of coarse aggregate (such as gravel), fine aggregate (such as sand), and cement clinker. The method includes the steps of:

A) Crushing:

The concrete waste is crushed by any suitable means well known in the art, such as through a crusher.

Figure 2:
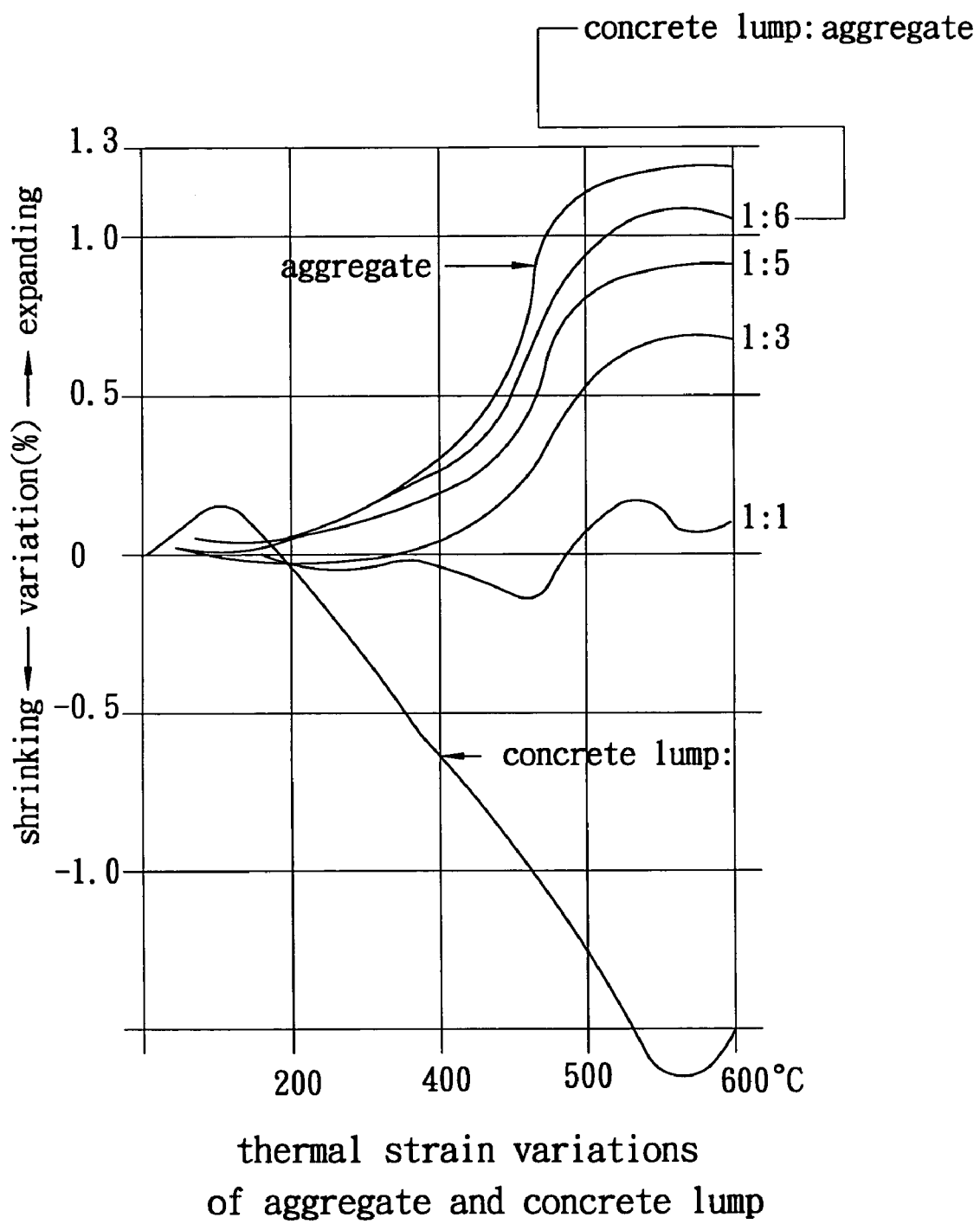
FIG. 2 is a graph showing thermal strain variations of aggregate and concrete lump depending on temperature.

B) Heating:

The concrete waste, after being crushed, is heated at an elevated temperature to provide a measure of fragility to the concrete waste. As shown in FIG. 2, according to tests conducted by the applicant, when concrete is heated to a temperature of 105° C., water contained in the pores of the concrete and absorbed thereby is dehydrated to cause a physical change. When the heating temperature reaches 200° C., the C—S—H (Calcium Silicate Hydrate) gels of the concrete begin to be dehydrated so as to lose bonding water and to cause a chemical change. When the heating temperature reaches 250-350° C., most of the bonding water contained in the hydrate of aluminum oxide ($Al_2O_3$) and ferric oxide ($Fe_2O_3$) is lost. When the heating temperature reaches a temperature of 400° C., the bonding water in the C—S—H gels is completely lost so as to result in shrinking. On the other hand, the aggregate expands as the temperature increases. Therefore, heating the concrete waste provides a measure of fragility to the concrete waste.

Furthermore, when the concrete waste is heated to a temperature above 500° C., silica ($SiO_2$) crystals change from $\alpha$ phase to $\beta$ phase. The aggregate may expand and eventually break due to thermal vibration energy. Therefore, in consideration of obtaining regenerated aggregate having superior performance, the preferable temperature for heating the concrete waste ranges from 400° C. to 500° C.

After the heating treatment, the concrete waste is provided with a measure of fragility due to the expansion of the aggregate and the shrinkage of the cement clinker at the elevated temperature.

C) Milling and Sieving:

The heated concrete waste is milled using a ball mill having steel balls of 80 mm in diameter, and is then sieved using a sieve shaker to separate coarse aggregate from the concrete waste. Preferably, the separated coarse aggregate has a particle size ranging from 5 to 20 mm. Since the concrete waste processed by the heating step became fragile, the coarse aggregate can be effectively separated from the concrete waste. That is to say, the separated coarse aggregate contains little concrete lump adhered thereon. Therefore, the separated coarse aggregate possesses superior properties and can be reused.

D) Magnetic Separation:

The remaining portion of the concrete waste remaining after separation of the coarse aggregate can be processed by a magnetic separator so as to separate metallic material from the remaining portion of the concrete waste.

E) Milling and Sieving:

The remaining portion of the concrete waste primarily having a particle size smaller than 5 mm is milled using a ball mill having steel balls of 10 mm in diameter, and is then sieved using an air sorter so as to separate the remaining portion of the concrete waste into a cement-containing fraction having a particle size smaller than 0.15 mm and fine aggregate having a particle size ranging from 0.15 to 5 mm.

The separated fine aggregate can be reused. The cement-containing fraction obtained at this step has no cementing property.

F) Adding CaO and Heating:

The cement-containing fraction is mixed with an appropriate amount of CaO to form a mixture, which is then heated preferably at a temperature ranging from 600 to 700° C. to obtain regenerated cement having cementing property. Additionally, the regenerated cement is milled together with gypsum.

A comparison between the ingredients of the cement-containing fraction obtained by the method of this invention and Portland cement type I is shown in Table 1.

TABLE 1

|  | Ingredient | | | |
| --- | --- | --- | --- | --- |
|  | $SiO_2$ (wt. %) | $Al_2O_3$ (wt. %) | $Fe_2O_3$ (wt. %) | CaO (wt. %) |
| Cement-containing portion | 30-55 | 5-9 | 2.5-7.5 | 18-37 |
| Portland cement | 21.32 | 6.17 | 3.10 | 64.5 |

As shown in Table 1, the cement-containing fraction contains ingredients having comparable amounts to those of the Portland cement type I, except that the cement-containing fraction contains less amount of CaO. Therefore, the insufficient amount of CaO in the cement-containing fraction can be supplemented by adding an appropriate amount of CaO.

As for the cementing property of conventional cement (i.e., cement clinker), the main raw material for the cement is clay mineral, which is heated at a temperature of about 600° C. to separate silica ($SiO_2$), aluminum oxide ($Al_2O_3$) and ferric oxide ($Fe_2O_3$) therefrom. Additionally, limestone is heated at a temperature ranging from 800 to 1000° C. to separate calcium oxide (CaO) therefrom. Calcium oxide is then contacted with silica, aluminum oxide and ferric oxide at an elevated temperature to form tricalcium silicate ($3CaO \cdot SiO_2$), dicalcium silicate ($2CaO \cdot SiO_2$), tricalciumaluminate ($3CaO \cdot Al_2O_3$) and tetracalcium aluminoferrite ($4CaO \cdot Al_2O \cdot Fe_2O_3$) of the cement clinker.

The cement-containing fraction of this invention is obtained by milling concrete lumps. Since the concrete lumps lost its cementing property after being obtained by solidifying a cement paste formed by mixing cement clinker with water, the mixture of the cement-containing fraction and CaO is thus heated at a temperature ranging from 600 to 700° C., preferably at a temperature of 650° C., to obtain the regenerated cement having the cementing property.

Figure 3:
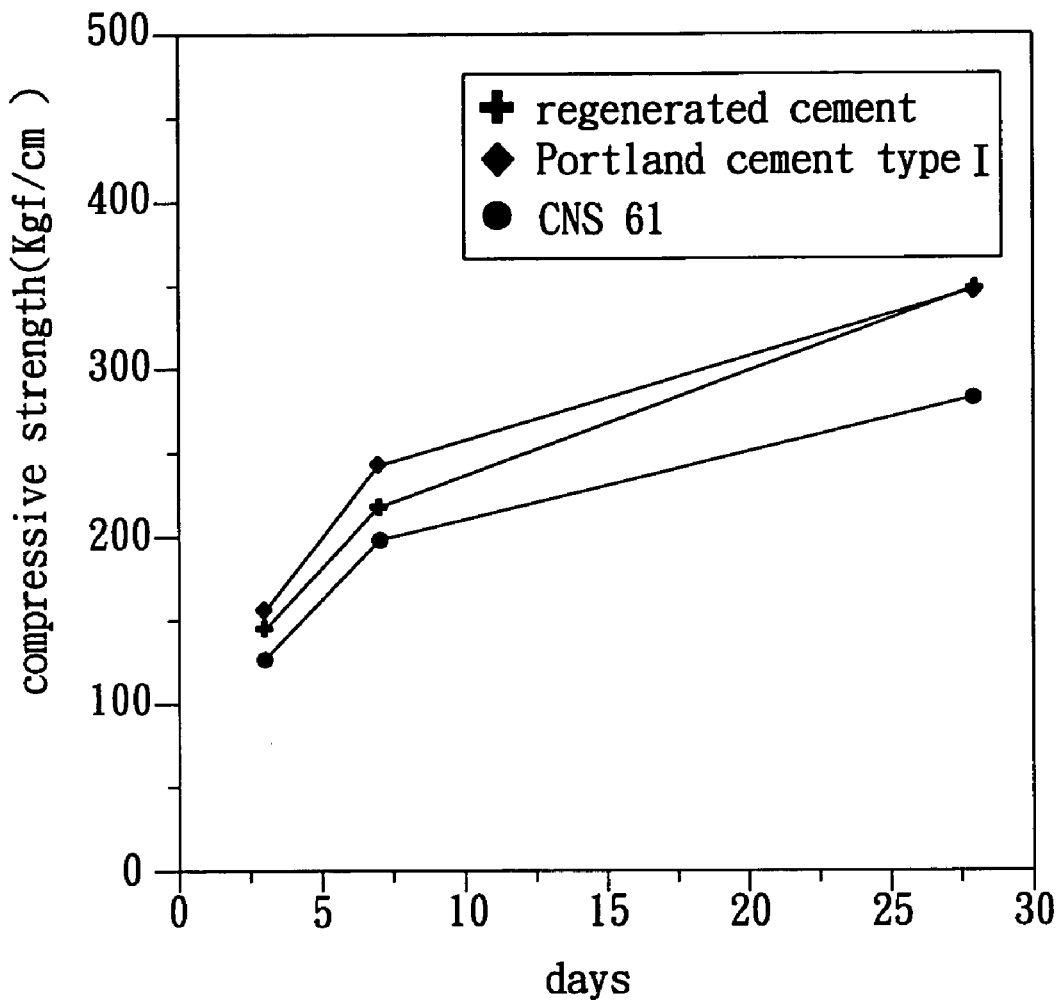
FIG. 3 is a graph showing a comparison of compressive strength between the regenerated cement made by the preferred embodiment of this invention and Portland cement type I.

As shown in FIG. 3, according to the test of compressive strength between the regenerated cement made by the preferred embodiment of this invention and Portland cement type I, the regenerated cement made by this invention has the compressive strength, which is comparable to that of Portland cement type 1, and which is above that of CNS (Chinese National Standard) 61.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for recycling concrete waste, comprising the steps of:
    a) heating the concrete waste to provide a measure of fragility to the concrete waste;
    b) milling and sieving the heated concrete waste to separate coarse aggregate from the concrete waste; and
    c) milling and sieving a remaining portion of the concrete waste remaining after separation of the coarse aggregate to separate the remaining portion of the concrete waste into a cement-containing fraction and fine aggregate.

2. The method as claimed in claim 1, further comprising a step of crushing the concrete waste before the step a).

3. The method as claimed in claim 1, wherein the coarse aggregate has a particle size ranging from 5 to 20 mm, the fine aggregate having a particle size ranging from 0.15 to 5 mm, the cement-containing fraction having a particle size smaller than 0.15 mm.

4. The method as claimed in claim 1, further comprising a step of magnetic separation to separate metallic material from the concrete waste.

5. The method as claimed in claim 1, wherein the step a) is conducted at a temperature ranging from 400 to 500° C.

6. The method as claimed in claim 1, wherein the step c) is conducted using an air sorter.

7. The method as claimed in claim 1, further comprising a step of mixing the cement-containing fraction with CaO, and heating the mixture of the cement-containing fraction and CaO to obtain regenerated cement.

8. The method as claimed in claim 7, wherein the mixture is heated at a temperature ranging from 600 to 700° C.

9. The method as claimed in claim 7, further comprising a step of milling the regenerated cement together with gypsum.

10. A method for making regenerated cement, comprising the steps of:
    a) separating a cement-containing fraction from concrete waste; and
    b) mixing the cement-containing fraction with CaO, and heating the mixture of the cement-containing fraction and CaO.

11. The method as claimed in claim 10, wherein the mixture is heated at a temperature of about 650° C.

12. The method as claimed in claim 10, wherein the cement-containing fraction has a particle size smaller than 0.15 mm.

13. The method as claimed in claim 10, further comprising a step of milling the cement-containing fraction with gypsum.

* * * * *